United States Patent [19]

Nagashima et al.

[11] Patent Number: 4,768,146

[45] Date of Patent: Aug. 30, 1988

[54] VECTOR DATA REFER CIRCUIT WITH A PRECEDING PAGING CONTROL FOR A VECTOR PROCESSOR APPARATUS THEREFOR

[75] Inventors: Shigeo Nagashima, Hachioji; Koichiro Omoda, Sagamihara; Yasuhiro Inagami, Kodaira, all of Japan

[73] Assignee: Hitachi, Ltd., Tokyo, Japan

[21] Appl. No.: 859,373

[22] Filed: May 5, 1986

[30] Foreign Application Priority Data

May 7, 1985 [JP] Japan .................................. 60-95440

[51] Int. Cl.⁴ .............................................. G06F 9/00
[52] U.S. Cl. ..................................................... 364/200
[58] Field of Search ........................ 364/200 MS File

[56] References Cited

U.S. PATENT DOCUMENTS

| | | |
|---|---|---|
| 3,533,075 | 10/1970 | Johnson et al. ...................... 364/200 |
| 4,128,880 | 12/1978 | Cray, Jr. .............................. 364/200 |
| 4,218,743 | 8/1980 | Hoffman et al. ..................... 364/200 |
| 4,231,088 | 10/1980 | Hammer et al. ...................... 364/200 |
| 4,290,104 | 9/1981 | Holtey et al. ........................ 364/200 |
| 4,513,371 | 4/1958 | Celio .................................. 364/200 |
| 4,620,275 | 10/1986 | Wallach et al. ..................... 364/200 |
| 4,677,547 | 6/1987 | Omoda et al. ....................... 364/200 |

Primary Examiner—Gareth D. Shaw
Assistant Examiner—Debra A. Chun
Attorney, Agent, or Firm—Antonelli, Terry & Wands

[57] ABSTRACT

A unit operative in concurrence with a vector processing for beforehand sequentially generating page addresses containing vector data to be referred to thereafter and a unit for achieving a processing to determine whether or not a page fault occurs in a page in an address translation and responsive to an occurrence of a page fault in a page for executing processing to beforehand transfer the page to a main storage are provided. Even if a vector element existing in the page becomes necessary in the vector processing after the operation described above, another paging processing is not necessary because the page exists in the main storage.

3 Claims, 4 Drawing Sheets

VECTOR DATA REFER CIRCUIT WITH A PRECEDING PAGING CONTROL FOR A VECTOR PROCESSOR APPARATUS THEREFOR

BACKGROUND OF THE INVENTION

The present invention relates to a circuit for referring to vector data in a main storage of a digital computer suitable for executing a fast vector processing (to be referred to as a vector processor herebelow) based on a virtual address. A vector processor has been developed for high-speed processing, for example, a large-sized matrix calculation frequently appearing in a scientific and engineering calculation. An example of such a vector processor has been described in the U.S. Pat. No. 4,128,880.

On the other hand, there has been used a virtual address system which allows an address space to exceed the main storage capacity of a computer. A scheme for achieving such a virtual address system has been discussed in the Structured Computer Organization (Prentice-Hall Inc., 6.4 Virtual Memory, pp. 308-341) written by A. S. Tanebaum.

There has also been a vector processor in which the virtual address system is implemented. However, the prior art vector processor configured in the virtual address system has the following problem.

In the virtual address system, when an address translator detects that a data item which is required to be found in the main storage is missing therein, a page fault interruption takes place and the operating system (OS) effects processing (paging) for transferring data from an auxiliary storage to the main storage. Thereafter, the contents of an address translation table are changed to allow the data transferred and stored in the main storage to be accessed after this point, and then the original processing interrupted is resumed. Such a processing in which the data is reserved by use of paging when the data becomes necessary is called on-demand paging in general.

The conventional vector processor has also adopted the on-demand paging. That is, as shown in FIG. 1, a paging processing 12 is first initiated only when the vector data is necessary. The vector processing 10 is interrupted for a period of time required by the paging processing, which leads to a problem that the vector processing time is undesirably increased.

SUMMARY OF THE INVENTION

It is therefore an object of the present invention to provide a vector data refer circuit which is capable of effecting a paging processing without interrupting a vector processing.

To this end, according to the present invention, there is provided a circuit as shown in FIG. 2 comprising means operative in concurrence with a vector processing 10 for beforehand sequentially creating page addresses containing vector data to be referred to thereafter and means for effecting a processing 11 to determine whether or not a page fault occurs in a page in an address translation and responsive to an occurrence of a page fault in a page for effecting processing 13A-13B to beforehand transfer the page to a main storage b1 (referred to as a pre-paging processing). Even if a vector element existing in the page becomes necessary in the vector processing after this point, another paging processing is not required because the page exists in the main storage b1.

BRIEF DESCRIPTION OF THE DRAWINGS

The present invention will be apparent from the following detailed description taken in conjunction with the accompanying drawings in which.

DETAILED DESCRIPTION OF THE PREFERRED EMBODIMENT

First of all, the principle of the operation for generating a vecotr address will be described.

In a vector processor, a vector in a main storage is generally referred to on the basis of a given initial vector element address $VA_0$ and a given vector element address increment $VI$. The vector element address $VAi$ can be obtained as follows.

$$VAi = VA_0 + VI*(i-1) \qquad (1)$$

Figure 1:
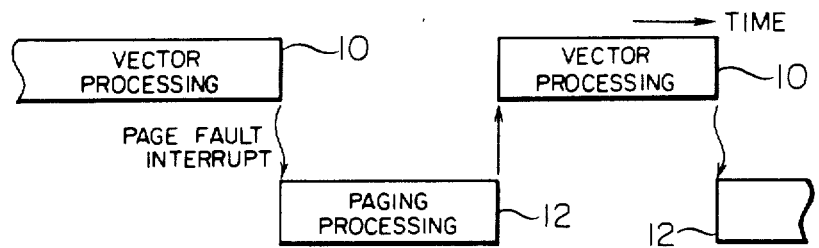
FIG. 1 is a schematic diagram illustrating a paging processing in the prior art vector processing.
Figure 2:
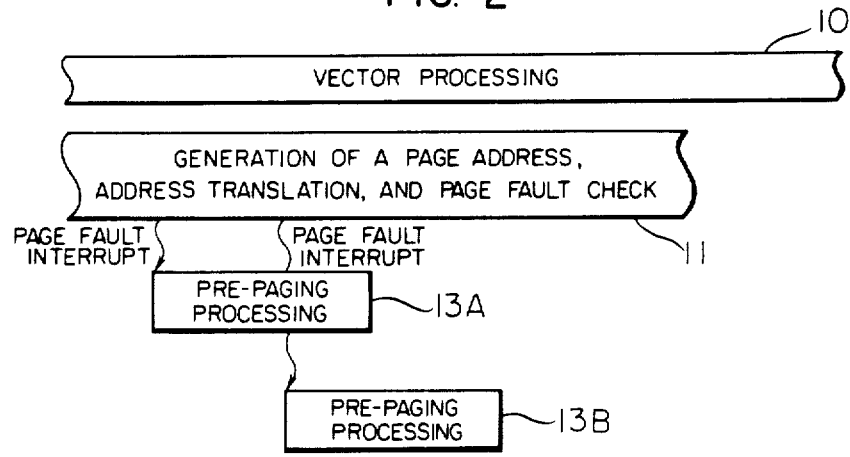
FIG. 2 is a schematic diagram representing a prepaging procesing which is characteristic to the vector processing in accordance with the present invention.
Figure 3:
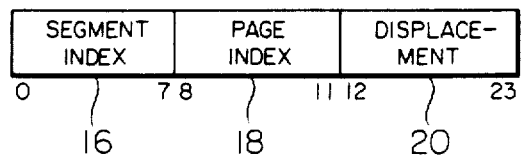
FIG. 3 is a diagram depicting a virtual address format used in an embodiment of the present invention.

In the actual calculation, $VA_1$ is first determined by $VA_0+VI$, and then $VA_2$ is attained by $VA_1+VI$. The vector element addresses can be calculated by repeatedly executing these operations so that the necessary vector elements are fetched and stored with reference to the main storage based on the resultant vector element addresses. On the other hand, the paging processing is generally effected in page units (for example, in 4K-byte units). That is, as shown in FIG. 3, an address data item comprises a segment index field 16, a page index field 18, and a displacement field 20. When the total of each field length forms the bit length of this item, the page size is 4K bytes. The number of vector elements contained in a page depends on the data length of each vector element and the vector element address increment. For example, assuming the length of a vector element and the vector element address increment each to be eight bytes, the number of the vector elements per page is 512. In this case, if the total length of all vector elements of the vector data (namely, the vector length) exceeds 512 bytes, the vector data is stored over two pages or more. Consequently, if a vector element is once confirmed to exist in the main storage, a paging processing is not required when the main storage is referred to for a vector element belonging to the same page as that of the vector element confirmed. However, if the main storage is accessed for a vector element residing in another page, a paging processing is necessary for each main storage access. The address of the page including a vector element is determined by setting the value of the displacement field 20 of the address representation for the vector element as shown in FIG. 3. In this embodiment, when a request for referring to the main storage occurs for a vector data, the pages from an address PA(O) of a page, including the initial element, to an address PA(VL) of a page including the final element are beforehand generated, and then the address translation is achieved for each of the obtained pages to determine whether or not the respective pages exist in the main storage. If a page is missing in the main storage, an operation is accomplished to transfer the page to the main storage by use of the paging processing in concurrence with an inherent main storage refer operation caused by the request for referring to the vector data. Since the inherent vector refer operation sequentially refers to a plurality of vector elements in a page in general, the operation to determine the presence or absence of a page in the main storage can be accomplished faster than the inherent vector refer operation. Consequently, an advanced paging, namely a pre-paging can be executed before the vector processing requires the page, which improves the processing speed as compared with the on-demand paging in which the pertinent paging is effected when the page becomes necessary in the inherent vector processing.

If the vector element address increment VI is at least 4K bytes, only one vector element is contained in a page, and therefore the effect of the pre-paging is not developed; consequently, the on-demand paging is used in this case. Such a case, however, rarely takes place.

The end processing of the paging is executed as follows. Based on a given vector length VL, the final vector element address is beforehand calculated by use of the following expression.

$$VA_0 + VI*(VL-1) \qquad (2)$$

The paging processing is terminated when the paging address to be subjected to the next paging processing exceeds the page address including the obtained address.

Figure 4:
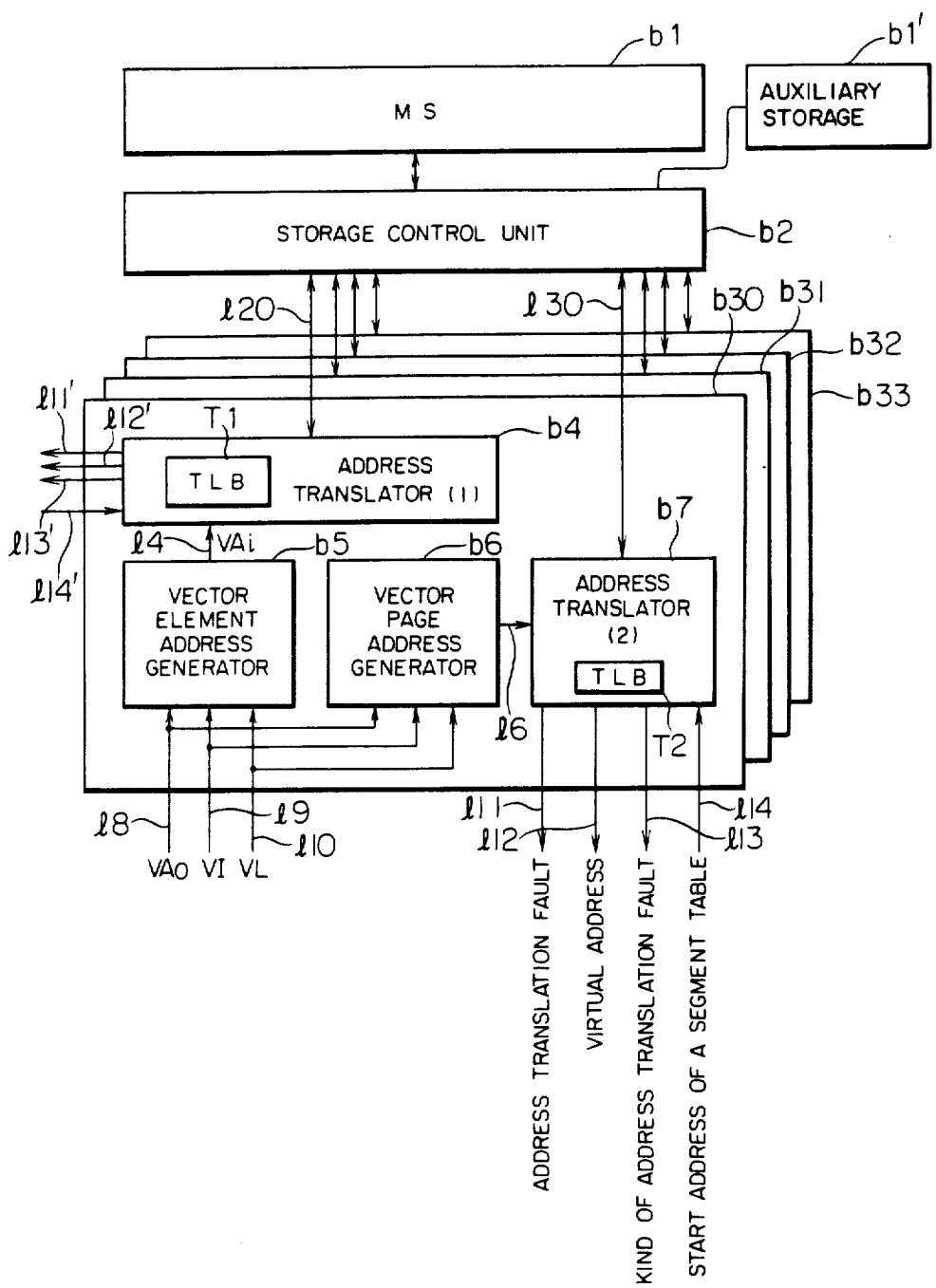
FIG. 4 is a circuit block diagram illustrating an embodiment of the present invention.

FIG. 4 is a block circuit diagram of a vector processor as an embodiment of the present invention in which the elements necessary for referring to the main storage are depicted. The configuration includes a main storage (MS) b1, an auxiliary storage b1′, a storage control unit b2, and main storage access request circuits b30–b33 each comprising a first address translator b4, a vector element address generator b5, a vector page address generator b6, and a second address translator b7. The configuration of the first and second address translators b4–b7 each are the same as that of a dynamic address translator included in a common general-purpose computer. The address translators b4–b7 include buffers for highspeed address translation, namely, translation lookaside buffers (TLB's) T1–T2, respectively. Operations of these buffers will be described later. The reason why a plurality of main storage access request circuits b30–b33 are provided is to achieve a concurrent operation for referring to a plurality of vector data items; however, this is not essential to the present invention, and hence a description will be given of only one main storage access request circuit b30.

When a vector refer request occurs in a program, the initial vector element address VA$_0$, the vector element address displacement VI, and the vector length VL are supplied to the address generator b5 through lines 18, 19, and 110, respectively. The address generator sequentially calculates the address VAi of each vector element i (i=1−VL), namely, all vector element addresses. The resultant addresses are represented in the virtual address space. The vector element addresses VAi are then inputted to the first address translator b4 so as to be converted into the real addresses, which are in turn transferred via a line 20 to the storage control unit b2 to access the main storage b1.

In order to effect the pre-paging which is the primary feature of the present invention, the vector page address generator b6 is also provided with the initial vector element address VA$_0$, the vector element address increment VI, and the vector length VL through the lines 18, 19, and 110, respectively. The vector page address generator b6 sequentially generates the virtual page addresses PA(O)–PA(VL) in a range from a page including the initial vector element to a page including the final vector element, which are then delivered via the line 16 to second address translator b7. Based on a start address of a segment table fetched from the main storage b1 through the line 114, the second address translator b7 translates the virtual page addresses received via the line 16 into the real addresses, which will be further described later. A line 130 is provided as an interface line for referring to a segment table t$_1$ and a page table t$_2$ (FIG. 6) in the main storage b1. In an address translation, if it is found that a segment to which the necessary page belongs is missing in the main storage or that the necessary page is missing in the segment existing in the main storage, an event indicating that an address translation fault such as a page fault or a segment fault has occurred, the pertinent virtual address, and the kind of the address translation fault are indicated to a known interruption processing circuit (not shown) in the vector processor via the lines 111, 112, and 113, respectively. The subsequent processing thereafter is identical to that of the prior art technique. The operating system (OS) usually performs the processing for the succeeding interruptions. The OS analyzes the kind of the address translation default, and if this is a page fault, a program and data in a page specified by the virtual page address are transferred from the auxiliary storage b1′ to the main storage b1 and a bit I of the page table t$_2$ (FIG. 6) in the main storage b1 is changed to indicate that the page exists in the main storage b1.

When the OS executes an interruption processing, a scalar program being executed is usually suspended. However, the scalar and vector programs can be concurrently executed in ordinary cases. For example, a vector processor of the U.S. Pat. No. 4,541,046 comprises a scalar processing unit for executing a program including scalar instructions and a vector processing unit for executing a program including vector instructions, and these scalar and vector processing units can be concurrently operated. This literature is incorporated herein by reference.

When the interruption occurs and if there exists a scalar program being executed in the scalar processing unit, the scalar program is interrupted and the program for the interruption is initiated, whereas a program comprising vector instructions for the vector processing is not interrupted and continues to be executed in the vector processing unit. Consequently, even when the interruption for the pre-paging processing occurs, the vector processing being executed continues to be executed without being affected by the interruption.

Figure 5:
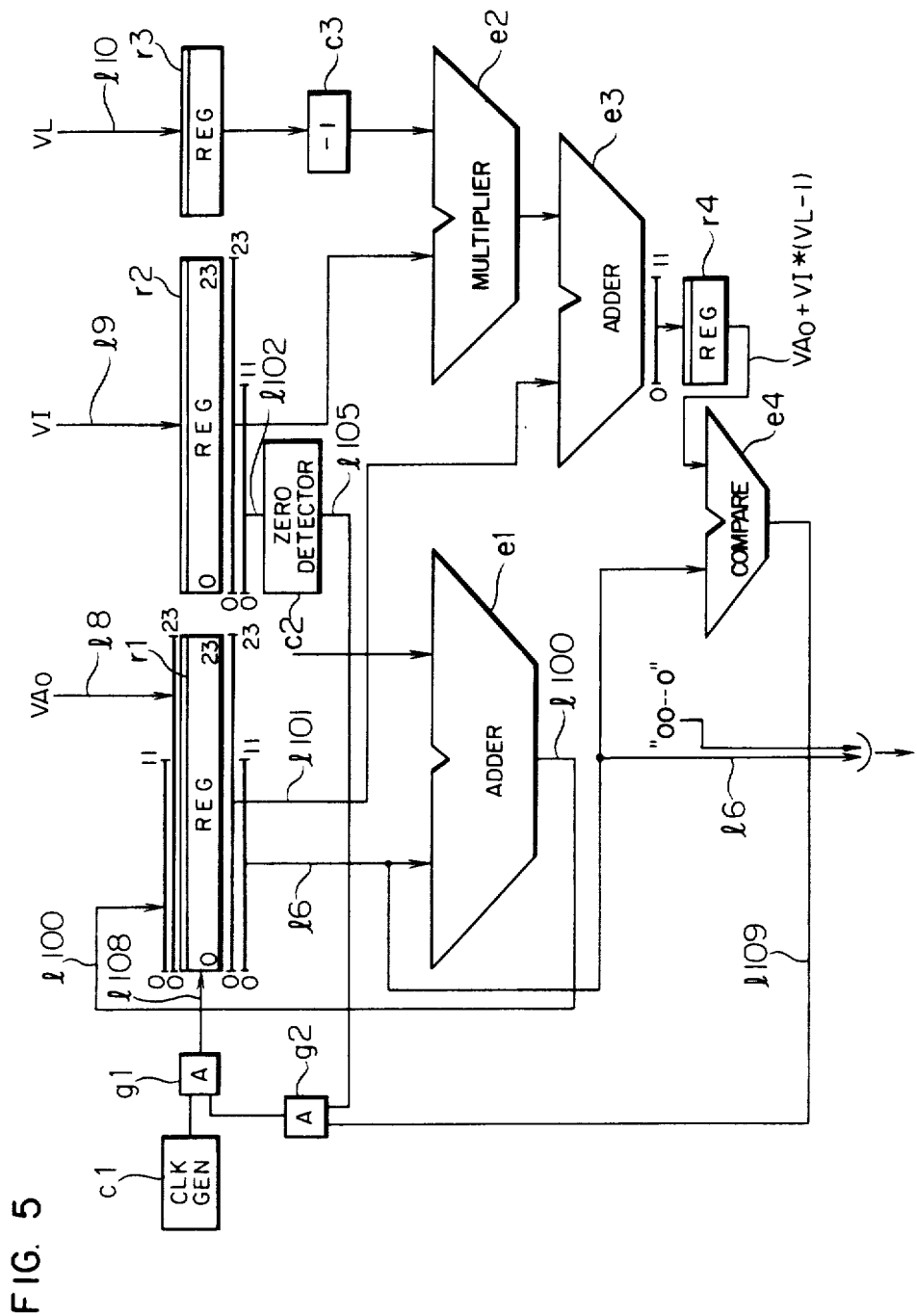
FIG. 5 is a schematic block diagram showing the configuration of a vector page address generator of FIG. 4.

FIG. 5 is a schematic block diagram depicting in detail the vector page address generator b6. The initial vector element address VA$_0$, the vector element address increment VI, and the vector length VL are inputted to registers r1, r2, and r3, respectively, through lines 18, 19, and 110. The final vector element address is calculated by use of the expression (2), and the resultant data is stored in the register r4 with the 12 low-order bits (displacement field) ignored. This calculation is accomplished as follows. First, the output from the register r3 is inputted to the subtractor c3 so as to be decremented by one, and the obtained value is inputted to an input terminal of a multiplier e2. Next, the output from the register r2 is supplied to another input terminal of the multiplier e2, thereby obtaining $VI*(VL-1)$. The resultant data is delivered to an input terminal of an adder e3, and the initial vector element address $VA_0$ is supplied from the register r1 to another input terminal of the adder e3. The result of the addition executed by the adder e3, namely, $(VA_0+VI*(VL-1))$ is thus attained. The 12 high-order bits of this address indicate the address of the page including the vector element.

When the preparation described above is completed, an address generation is started for a paging processing. The 12 high-order bits comprising the segment index field and the page index field in the register r1 represent the address of the page including the initial vector element. This address is inputted to an adder e1 to be incremented by one, and the resultant data is set again into the register r1 via a line 1100. This setting operation is controlled through a line 1108. That is, the operation for setting the output from the adder e1 to the register r1 is indicated by a clock signal from a clock generator c1. If the following two conditions are satisfied, the output data is loaded in the register r1. First, the vector element address increment VI is smaller than the page size (4K bytes in this embodiment). In this case, the segment index field and the page index field, namely, bits 0–11 of the register r2 containing the vector element address increment VI are $\phi$. To detect $\phi$, the 12 high-order bits of the register r2 are inputted to a zero detector c2 via a line 1102. Only when $\phi$ is detected, the zero detector c2 transfers "1" via a line 1105 to an AND gate g2. Secondly, the page address of the register r1 does not exceed the final vector element address. To detect this condition, the 12 high-order bits of the register r4 containing the final vector element address and the 12 high-order bits of the register r1 are inputted to a comparator e4. If the latter is equal to or less than the former, the comparator e4 transmits "1" to a line 1109. When these two conditions are satisfied, and AND gate g2 is turned on and the AND gate g1 is opened so that the clock signal is transmitted to the line 1108. Each time the clock signal is inputted to the register r1, the output from the adder e1 is set into the register r1. The 12 high-order bits of the register r1 thus contain a value indicating an address which is greater by one than the page address of the page including the initial vector element. Similarly, the 12 high-order bits of the register r1 sequentially indicate an address which is greater than the page address by one. This operation is repeatedly executed until the page address indicated by the 12 high-order bits of the register r1 exceeds the page address of the final vector element. The 12 high-order bits of the page address thus created are supplied to the second address translator b7 together with the 12 low-order bits added thereto.

Figure 6:
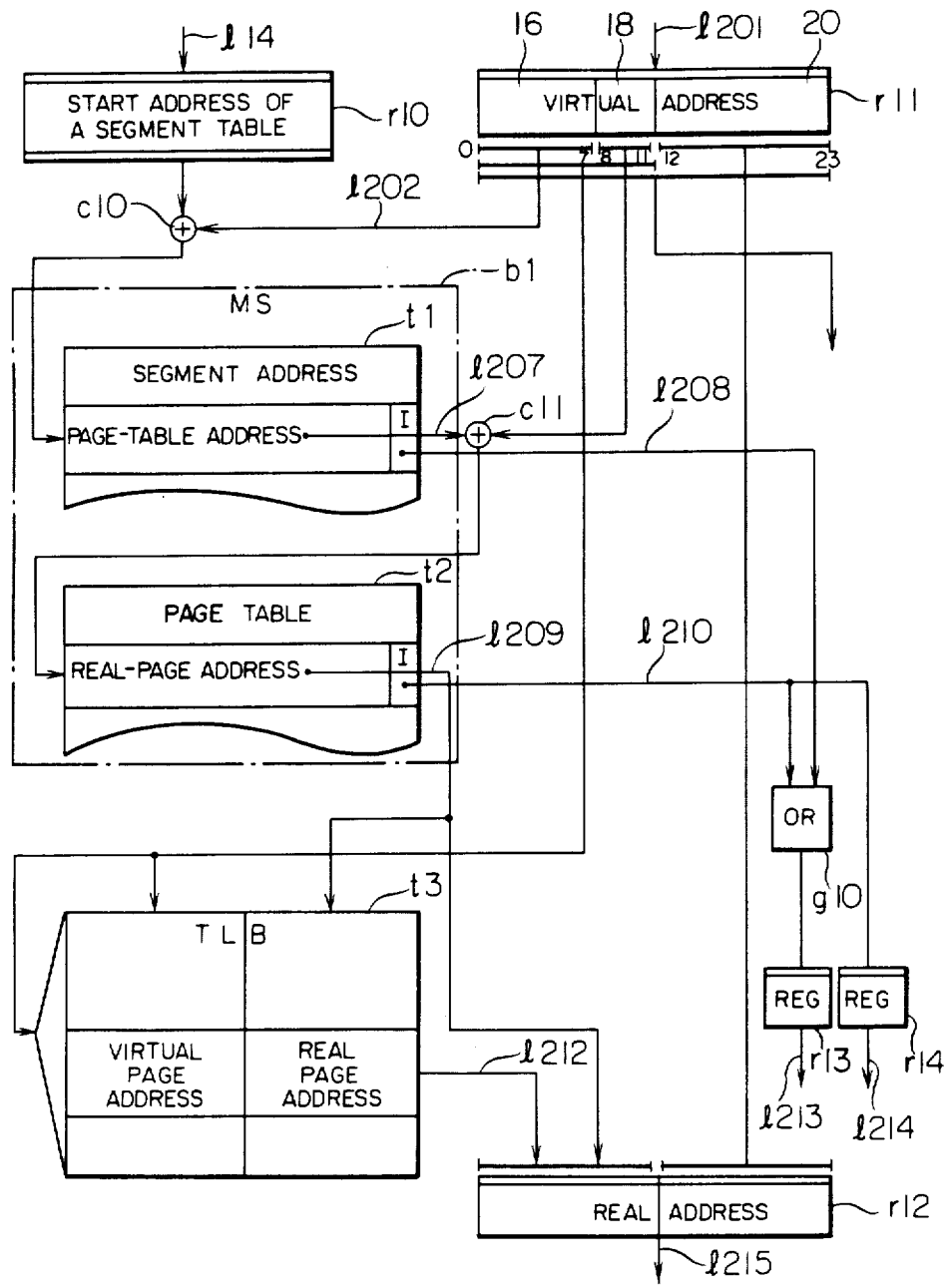
FIG. 6 is a simplified block diagram illustrating a first address translator and a second address translator of FIG. 4.

FIG. 6 is a schematic circuit diagram showing an address translator identical to the prior art translator to be used as the address translator b4 or b7. A virtual address to be subjected to an address translation is inputted via a line 201 to a register r11. The virtual address comprises a segment index field 16, a page index field 18, and a displacement field 20. First, the segment table start address inputted from a line 114 and stored in a register 10 is added to the segment index field 16 of the virtual address in the register r11 by use of an adder c10. Based on the resultant address, the page table address is fetched from the segment table $t_1$ (existing in the main storage) and is transmitted to a line 1207. The obtained content is added to the page index field 18 of the register r11 by use of the adder c11, and then the real page address is fetched from the page table $t_2$ (also existing in the main storage) and is transmitted to a line 1209. This real page address is combined with the displacement of the register r11 to form a real address, which is set into register r12. When fetching the segment tables $t_1-t_2$, if the bit I is "1" indicating that the segment or page is missing in the main storage (namely, a segment or page fault), an indication is set to designate that an address translation fault occurs. The designation information is sent to lines 1208–1210 and is ORed by an OR gate g10, and then the result is set into a register r13. On the other hand, the information indicating the page fault is set via the line 1210 into a register r14. Output lines 1213 and 1214 from the registers r13 and r14, respectively, represent the detection of and the kind of address translation fault, respectively, ("0" for the segment fault and "1" for the page fault). The virtual address for which the address translation fault has occurred is outputted from the register r11 through a line 1205. If a segment or page fault is detected, the translation processing thereafter is not carried out. The bit 1 indicating a segment or page fault is controlled by the OS. That is, for example, if the OS effects a processing after a page fault so that the necessary page exists in the main storage b1, the bit I of the page table corresponding to the page is set to $\phi$. If the address translator b4 or b7 accesses the page table again thereafter, the address translation is successfully accomplished because the bit I has been set to $\phi$, namely, the necessary page can be referred to.

The ordinary address translation process has been described, however, since the address translation tables (segment and page tables) exist in the main storage, the processing is time consuming if this operation is executed for each address translation. To minimize the processing time, pairs of virtual and real page addresses are beforehand stored in a high-speed virtual storage and the required page is first checked to determine whether or not it has been registered to the pairs in ordinary cases. The associative storage is called a translation lookaside buffer (TLB). Receiving a virtual address via a line 1204, the TLB $t_3$ checks to determine whether the received virtual page address has been registered or not. If this is the case, the TLB $t_3$ fetches the real page address paired therewith, transmits the real page address to a line 1212, and sets the real page address into the register r12. If the virtual page address has not been registered to the TLB $t_3$, the address translation process is executed and a pair of the virtual page address and the obtained real page address is registered to the TLB $t_3$, which completes the address translation operation.

Returning to FIG. 4 again, the input/output lines 111'–114' of the first address translator b4 are adapted to communicate the same signals as those transferred through the input/output lines of the address translator b7.

In the embodiment, if the initial vector element is missing in the main storage b1, a segment or page fault similarly occurs for the same page in the address translation by the first address translator b4 for this vector element and in the address translation by the second address translator b7 for the page address including this element. In this case, the OS that handles the fault checks the virtual address for which the fault has occurred. If the faults are found to have occurred at the same address, these fault operations are consolidated into a fault processing.

As described above, the page addresses necessary for referring to vector elements are beforehand generated and the pertinent address translation is accomplished in advance, and an operation for transferring the necessary pages to the main storage prior to the usage thereof is executed in concurrence with an inherent operation for referring to vector elements, thereby making it possible to reduce the processing time as compared with the on-demand paging system.

We claim:

1. A vector data refer circuit in a data processor having a main storage and an auxiliary storage in which, when a data item specified by a virtual address is missing in the main storage, a page of data is paged out from the main storage to the auxiliary storage and a page including a store area of the specified data is paged in to the main storage in place of the paged out data, said vector data refer circuit comprising:

element address generate means, responsive to a virtual address of an initial element of vector data to be accessed, an element address increment, and a total number of elements of the vector data, for sequentially generating virtual addresses of a plurality of elements of the vector data;

translate means connected to said element address generate means and the main storage and operative in response to a virtual address sequentially generated for each element of the vector data by said element address generate means for generating a real address of each element to access the main storage;

page address generate means, responsive to the virtual address of the initial element of the vector data to be accessed, the element address increment, and the total number of elements, for generating the addresses of the pages including the elements of the vector data to be accessed, while the virtual addresses of the elements are being generated by said element address generate means; and means connected to said page address generate means for determining whether or not a respective page associated with a respective generated page address has already been stored in the main storage and for outputting a signal, when there exists a page determined not to have been stored in the main storage, to indicate a page-in for the page, so that the page is paged in before a real address of an element associated with the page is generated by said address translate means.

2. A vector data refer circuit according to claim 1, wherein said page address generate means includes means for sequentially generating the addresses of the pages by incrementing an address of a page which includes the initial element until an address of a page which includes a last element of the vector data is generated.

3. A vector data refer circuit according to claim 1, wherein said page address generate means includes means for prohibiting the generation of the addresses of the pages when the element address increment exceeds a predetermined page size.

* * * * *